2,988,917
OPEN SEAM DETECTOR FOR METAL SHEATHED CABLES
Cecil A. Hallam, Westfield, and Thomas F. Herron, Jr., Trenton, N.J., assignors to Western Electric Company, Incorporated, New York, N.Y., a corporation of New York
Filed Jan. 22, 1957, Ser. No. 635,371
6 Claims. (Cl. 73—432)

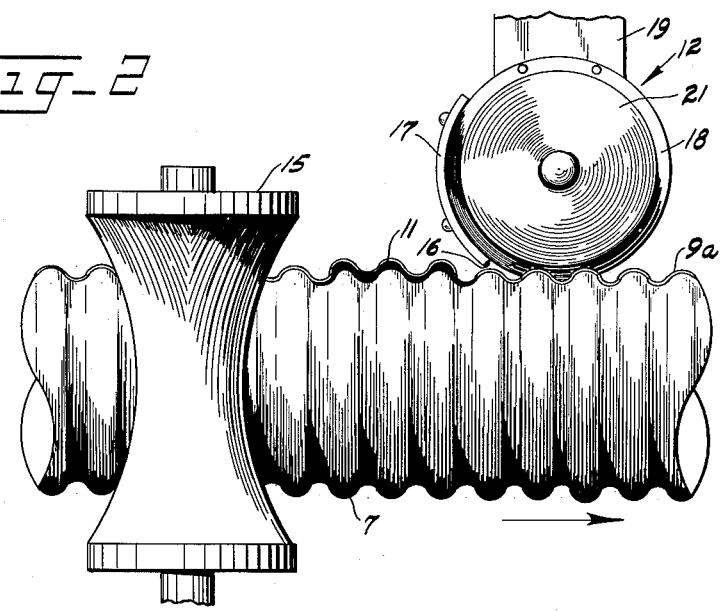
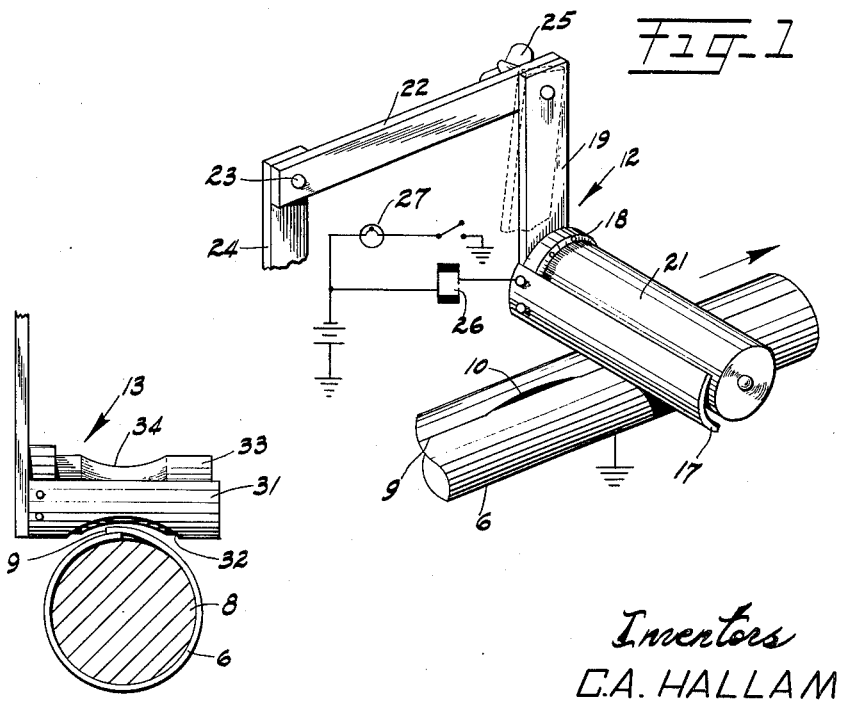

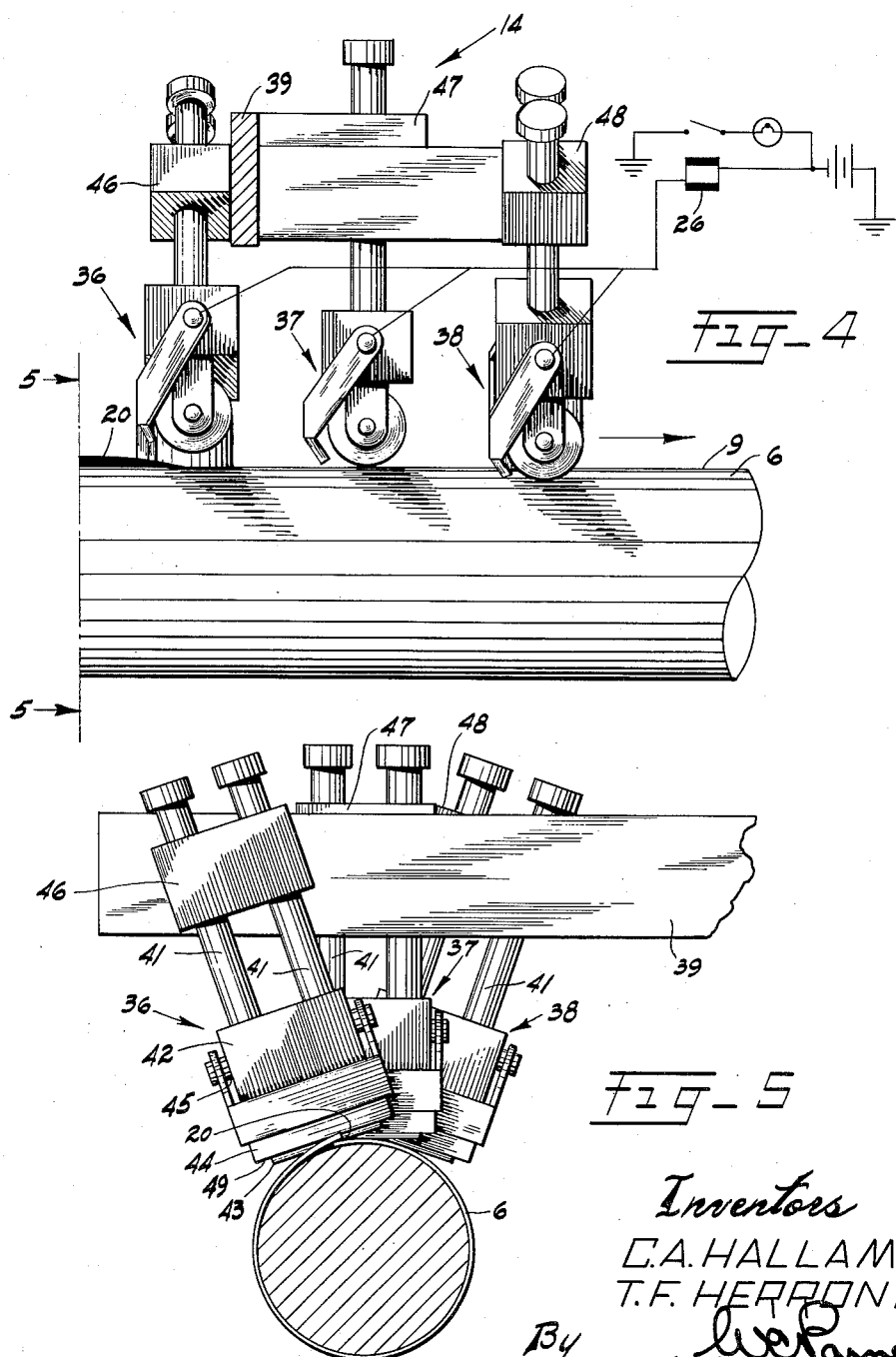

This invention relates to the testing of longitudinally extending seams in metal cable sheathings and particularly to a device for detecting open or discontinuous portions in such seams.

In the production of cables such as, for example, the type disclosed in Patent 2,589,700 to H. G. Johnstone, having a strip of sheet metal transversely formed around an advancing cable core with the edges thereof meeting in a butting or overlapping longitudinally extending seam which is continuously soldered or welded together, it is necessary that the seams be tested in order that discontinuities or openings therein be detected and repaired before a final plastic coating such as polyethylene is extruded thereover.

It is, therefore, the object of this invention to provide a simple, yet effective, device for continuously testing the seams in the sheathings of such cables as they are advanced along a fabricating line.

In one embodiment of the invention, a sensing element is supported in fixed relation to and on the cable entrance side of a support roller therefor which rides on top of the seam of the cable advancing axially along a given path. The element is spaced from, yet is sufficiently close to, the seam so that any seam portions not secured together and hence protruding slightly above the normal seam path will engage the element to actuate an associated alarm circuit.

An important feature of the invention is means for ensuring effective operation of the device in the detection of open seams even when the seam, which normally is located at the top of the advancing cable during its fabrication, shifts to one side or the other, due to twisting of the sheathing as it is advanced along the fabricating line past the test point.

These and other features of the invention will be more fully understood from the following detailed description taken in conjunction with the accompanying drawing, in which:

FIG. 1 is a perspective view of an open seam detection device constructed in accordance with the invention;

FIG. 2 is an enlarged side elevational view of the device of FIG. 1 positioned on a corrugated metal cable sheathing;

FIG. 3 is a front elevational view of another embodiment of the invention utilizing an arcuately grooved support roller and an arcuately shaped sensing element;

FIG. 4 is a side elevational view of another embodiment of the invention utilizing a plurality of sensing elements angularly disposed around a cable; and FIG. 5 is a side elevational view of FIG. 4 as seen along the plane of line 5—5.

The open seam detectors 12, 13 and 14 shown in the drawing are designed to be utilized on conventional cable sheathing lines wherein plain or corrugated metal sheathings such as 6 or 7, respectively, are transversely formed around cable cores advanced axially along a given path, in the direction of the arrows, whereby the edges of the sheathing are brought together at the very top of the cable core and there soldered or welded in longitudinally extending butting or overlapping seams 9 and 9a. In case of discontinuities or open portions in the seam, the edges will not be held together and the resilience of the metal will cause them to be raised slightly from the cable, such as shown by the open seams 10, 11 and 20. As seen in FIG. 2, the open seam detector 12 may be positioned adjacent the cable exit side of a pair of opposed arcuately grooved rolls 15 on the sheathing line which, as disclosed in the co-pending application of E. W. Reynolds, Serial No. 633,360, filed January 9, 1957, are used to mechanically work the seam in the sheathing and round-up or restore the desired cross-section to the cable in the event it has been deformed during the fabrication of the sheathing.

The detector device 12 shown in FIGS. 1 and 2 comprises a sensing element 17 which is mounted to an insulator member 18 on an arm 19, the sensing element being positioned above the normal seam path through which the cable is moved, the straight effective edge 16 thereof being spaced from the soldered seam edges of the sheathing by means of a cable follower member or roller 21 which is rotatably supported on the arm 19. A shoe making sliding contact with the seams, as well as other means for mounting the sensing element a fixed distance from the actual path of the seam, could be used in place of the roller. The roller 21 rides on the overlap portion of seam 9 in the top of the cable sheathing, being free to move vertically in accordance with irregularities in the cable structure, the arm 19 being secured to a relatively long arm 22 which is free to pivot at 23 on a fixed member 24. The spacing between the sensing element 17 and the seam 9 of the cable sheathing may be varied as required for different cable sizes by loosening a wing nut 25 of a bolt holding the arms 19 and 22 together to pivot the arm 19 on the member 22. The lower surface of the sensing element 17 is set so that the raised edges of an approaching open seam such as 10 or 11 will engage or make contact with the lower edge of the element before such open seam portion reaches the roller 21. The element 17 could also be mounted on the cable exit side of the roller, in which case the trailing end of an open seam portion will make contact therewith as soon as such portion passes the roller. The element 17 is connected in the energizing circuit of a relay 26 which operates when the normally grounded sheathing 6 or 7 makes contact with the sensing element 17. On operating, the relay 26 closes an energizing circuit for a lamp 27 or other indicating or alarm device to notify the operator that an open seam has been encountered by the device. If desired, the relay 26 could be connected directly to the sheathing line drive control so that whenever an open seam is detected, the line would automatically be stopped to permit repairing the open seam and also to permit prompt adjustment of the soldering mechanism if it is at fault.

As mentioned above, in a conventional sheathing line, the edges of the sheathing are brought together and soldered at the very top of the cable core. In some instances, however, as the cable is advanced along the line, the cable core and sheath may become slightly twisted and shift the seam from the top to one side or the other. In the event that the only convenient location along the line for mounting the open seam detector is one where the sheathing seam is subject to such shifting, the embodiments shown in FIGS. 3 or 4 may be utilized. In the device of FIG. 3 a sensing element 31 is provided with an arcuately shaped detecting edge 32, the radius of curvature of which is slightly larger than that of the cable sheathing 6. The roller 33 is provided with an arcuately grooved portion 34 so that it will ride on the top of the sheathing 6 and support the curved portion of the sensing element substantially concentric with the cable sheathing. For purposes of illustration, the roller is shown separated from the sheathing; however, in practice, it rides in contact with the sheathing being advanced axially along the sheathing line to a take-up reel. With such concentric alignment, even though the seam may drift or shift from one side to another, the spacing between the edge of the sheathing at the seam and the sensing element 31 will remain substantially constant. The operation of this device is similar to that of the device of FIG. 1 and utilizes the same relay control circuit as shown therein.

The device of FIGS. 4 and 5 utilizes three identical detector units 36, 37 and 38, respectively, mounted on a fixed member 39, so that they are angularly disposed about the cable passing thereunder. The units are operatively similar to the device of FIG. 1, each being effective over only a portion of the arc through which the seam is subject to shift. The detector units 36, 37 and 38 are independently supported from the member 39 by means of extension members 46, 47 and 48 having through holes for slidably receiving shafts 41 extending from yoke units 42 which rotatably support rollers 43 and the sensing elements 44. Since the rollers 43 are independently supported on the sheathing, variations in sheathing diameter or flatness thereof will not affect the operation of the device. The sensing elements 44 are insulatedly mounted to the members 42 by means of insulating spacers 45 and may be pivoted thereon to set the spacing between the elements and the cable sheathing. The sensing elements in this embodiment have straight effective edges 49 and are connected in parallel, effectively defining an arcuate composite element which controls an indicating or alarm circuit similar to that disclosed in FIG. 1. In this case, however, the relay 26 is operative whenever an open seam edge is encountered by any one of the three units 36, 37 or 38.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A device for detecting open portions in a longitudinally extending seam of a cable sheathing being advanced axially along a predetermined path comprising a follower roller, means for supporting the roller to ride freely on the overlap portion of the seam of said cable sheathing and to move freely back and forth in a path transverse to the cable axis, a sensing element insulatedly mounted in fixed relation to and adjacent said roller and being spaced from the point of contact of the roller with the cable sheathing in a direction extending along the longitudinal axis of the cable sheathing, and an indicating circuit, in normal operation, the roller riding on the overlap portion of the cable sheathing and the element being positioned slightly above the cable sheathing, on occurrence of an open seam, the open seam engaging the element and causing operation of the indicating circuit.

2. A device according to claim 1 wherein the sensing element includes an arcuately shaped portion concentric with the cable sheathing.

3. A device for testing the continuity of a longitudinally extending seam in the vicinity of the top of a cable sheathing being advanced axially along a given path comprising a plurality of cable follower members, means having limited vertical movement independently supporting the members, the members supported angularly around the longitudinal axis of the supporting means and forming a top portion in continuous engagement with the top portion of such an advancing cable sheathing, a sensing element insulatedly mounted in fixed relation to each of the members and positioned adjacent the cable engaging portion thereof, angularly disposed from each other with respect to the sheathing and over that top portion of the sheathing containing the seam, said elements being spaced sufficiently close to the sheathing that raised edges of open seam portions will make contact with at least one of the elements and an indicator circuit, including the sensing elements, operable by the contact of a sheathing edge with any one of the elements.

4. A device for detecting open portions in a longitudinally extending seam in the vicinity of the top of a cable sheathing being advanced longitudinally along a predetermined path comprising a plurality of rollers, means independently supporting the rollers in angular disposition around the longitudinal axis of the supporting means and forming a top portion and in rolling engagement with the top portion of such an advancing cable sheathing, a sensing element insulatedly mounted in fixed relation to each of the rollers and positioned adjacent the cable engaging portions thereof, angularly disposed from each other with respect to the sheathing and over that portion of the sheathing containing the seam and being spaced sufficiently close thereto that raised sheathing edges of open seam portions will make contact with at least one of the elements and an alarm circuit, including the sensing elements, operable by the contact of a sheathing edge with any one of the elements.

5. In a device according to claim 3 in which each cable follower member and corresponding sensing element are mounted to a common member slidably supported from a fixed support for movement toward and away from the cable sheathing.

6. In a device according to claim 3 in which each cable follower member and corresponding sensing element are mounted to a common member slidably supported from a fixed support for movement toward and away from the cable sheathing, the sensing member being pivotally mounted to permit varying its spacing from the sheathing.

References Cited in the file of this patent

UNITED STATES PATENTS

| | | |
|---|---|---|
| 712,201 | Norden | Oct. 28, 1902 |
| 1,306,713 | Papineau | June 17, 1919 |
| 2,636,952 | Fahringer | Apr. 28, 1953 |
| 2,701,470 | Ames | Feb. 8, 1955 |
| 2,710,394 | Hallam et al. | June 7, 1955 |
| 2,886,966 | Hughes | May 19, 1959 |